United States Patent
Shaanan

[11] Patent Number: 5,406,882
[45] Date of Patent: Apr. 18, 1995

[54] BREWER

[75] Inventor: Gad Shaanan, Montreal, Canada

[73] Assignee: Shaanan Holdings Inc., Montreal, Canada

[21] Appl. No.: 220,153

[22] Filed: Mar. 30, 1994

[51] Int. Cl.[6] .............................................. A47J 31/32
[52] U.S. Cl. .................................. 99/287; 99/289 R; 99/297
[58] Field of Search ...................... 99/279, 289 R, 287, 99/289 T, 289 D, 289 P, 297, 316, 317, 319, 320; 426/433

[56] References Cited

U.S. PATENT DOCUMENTS

| | | | |
|---|---|---|---|
| 3,369,478 | 2/1968 | Black | 99/297 |
| 3,552,976 | 1/1971 | King . | |
| 3,565,641 | 2/1971 | King | 99/287 |
| 4,506,596 | 3/1985 | Shigenobu et al. . | |
| 4,833,979 | 5/1989 | Garulli | 99/297 |
| 4,852,472 | 8/1989 | In-Albon et al. . | |
| 4,934,258 | 6/1990 | Versini . | |
| 5,153,016 | 10/1992 | Göckelmann . | |
| 5,349,897 | 9/1994 | King | 99/287 |

Primary Examiner—Robert W. Jenkins

[57] ABSTRACT

A brewer for providing a single cup of coffee which comprises an outer cylindrical tubular member having an open top and a platform formed on the top. A slidable second cylindrical tubular member reciprocates within the first tubular member along the axis thereof and is provided with a gasket at the top thereof in sealing contact with the inner surface of the first tubular member. A permanent filter is provided at the top of the second cylindrical tubular member. A fixed piston head is located within the second cylindrical tubular member and is fixed relative to the first tubular member. A wiper is provided on the top platform of the first tubular member such that when the filter is in its uppermost position, the wiper can be activated to clean the coffee grounds from the filter. A pour spout is provided in the second cylindrical member which communicates with the fluid once the pour spout is above the level of the piston head. In operation, the filter moves downwardly towards the piston head such that air passes upwardly through the water and coffee grounds on the filter to agitate the mixture and then upwardly towards the top of the first tubular member such that a negative pressure is created between the filter and the piston head to draw the solution through the filter and eventually out by means of the spout in the wall of the second cylindrical tubular member.

10 Claims, 8 Drawing Sheets

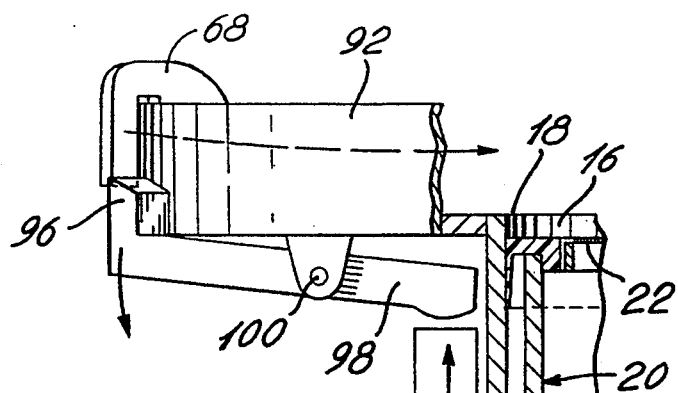
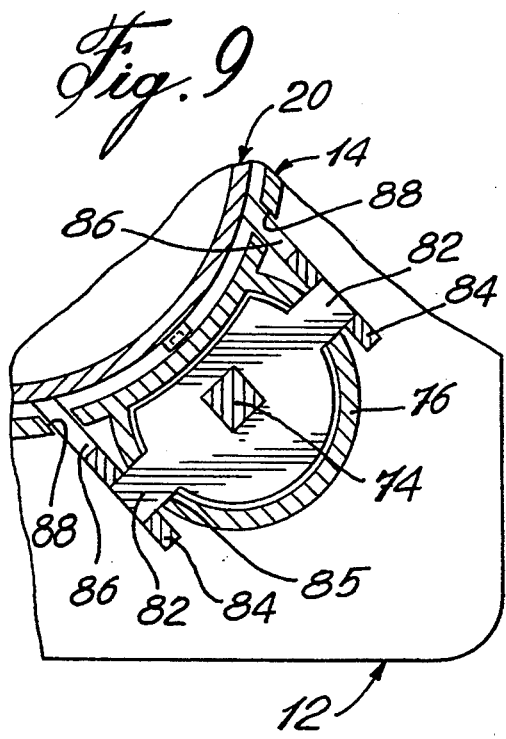
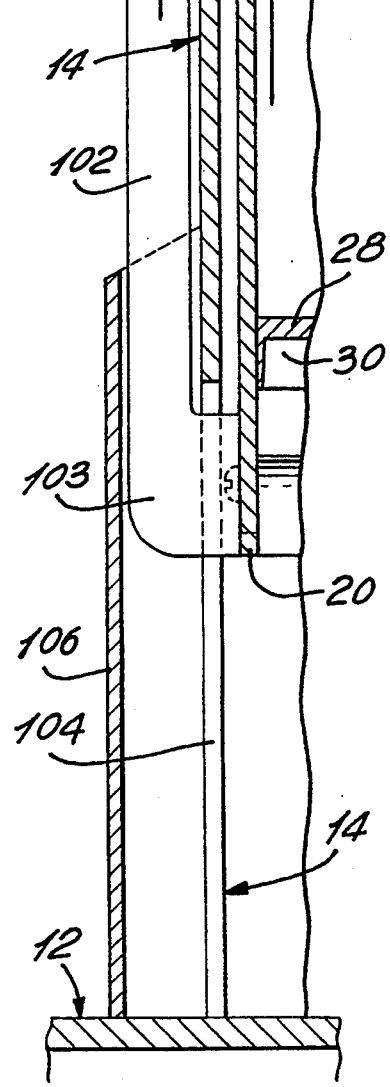
Fig. 9
Fig. 10

BREWER

BACKGROUND OF THE INVENTION

1. Field of the Invention

The present invention relates to brewers, and more particularly, to a brewer capable of making at least a single cup of beverage from fresh, infusible, ground alimentary material, such as coffee.

2. Description of the Prior Art

Heretofore, many attempts have been made to produce a single cup of freshly brewed coffee by percolation. This is particularly relevant in the case of automatic dispensing machines. Examples of prior art brewers include U.S. Pat. No. 3,552,976, King, 1971. The brewer in accordance with King '976 requires a porous support with a continuous band of filter paper passing over the support and an upper reciprocating tube which clamps the filter paper band in place on the support and acts as a receptacle for the coffee grounds and the hot water. A piston in a cylinder below the support draws the water under negative pressure through the filter paper band, and the brewed coffee flows through a spout in the side of the cylinder.

In U.S. Pat. No. 4,852,472, In-Albon et al, 1989, an espresso machine is described in which the ground coffee is first compressed by two pistons in a sliding scalding cylinder, and steam or hot water is passed therethrough at high pressure.

In U.S. Pat. No. 4,506,596, Shigenobu et al, 1985, a continuous filter tape is utilized, similar to King, '976, and a reciprocating cylindrical tube clamps down on the filter tape and porous support thereunder. Water and coffee grounds are poured into the tube, and a piston moves down in the tube to press the water through the grounds and the solution through the filter.

All of the above brewers are capable of brewing a single cup of fresh coffee. However, it has been found that one of the ingredients for obtaining superior brewing of coffee with a short dwell time is to agitate the grounds and water as the coffee is being brewed. In King, '976, the incidence of agitation is relatively minor. Both In-Albon et al, '472, and Shigenobu et al, '596, rely on high pressure infusion to produce a good quality brew. These latter systems are relatively expensive. Furthermore, the use of a filter paper band of the type described in King, '976, and Shigenobu et al, '596, requires frequent and additional maintenance to replace the filter band and to clean the areas surrounding the filter tape path.

SUMMARY OF THE INVENTION

It is an aim of the present invention to provide an improved brewer for making a single cup of coffee in which an element of agitation is introduced.

It is also an aim of the present invention to provide a brewer which does not require a replaceable filter tape.

It is a further aim of the present invention to provide an apparatus for brewing coffee which can be adapted as a coffee maker for domestic use or as a brewer for an automatic coffee dispenser.

A construction in accordance with the present invention comprises a first upright cylindrical tube having a smooth inner wall surface and an open top and a second cylindrical tube slidable within the first cylinder and including a filter means at the top end portion of the second cylinder and a gasket means adjacent the periphery of the top end and in sealing contact with the inner wall surface of the first cylindrical tube. Motor means are provided for moving the second cylindrical tube and the filter means axially within the first tube. A piston head provided within the second cylindrical tube is stationary relative to the first tube and includes gasket means about the periphery of the piston head in sealing contact with the inner wall surface of the second tube. A pour spout is provided in the wall of the second tube. The spout is spaced axially from the top of the second tube a distance such that the spout is below the piston head during most of the travel of the second tube and is above the piston head when the filter is near the top of its travel, whereby water and infusible alimentary grounds can be poured into the first tube through the open top thereof when the filter means is in a position intermediate the top end of the first tube and the piston head and the movement of the second tube including the filter means which can be initiated to move in a first axial direction towards the piston head whereby air trapped between the filter means and the piston head is forced through the filter means to create turbulence in the mixture, and then upwardly towards the top end of the first cylinder whereby the solution will pass through the filter under negative pressure and eventually through the spout.

In a more specific embodiment of the present invention, there is provided a wiper for cleaning the spent grounds from the filter means, wherein the filter means is a flat circular planar porous filter member at the top end of the second cylindrical tube, and the wiper includes a wiper blade pivotally mounted on the top of the first cylindrical tube and movable in a plane parallel to the planar filter member and in sweeping contact therewith when the second cylindrical tube and the planar filter member are in the uppermost position of travel, and means are associated with the second cylindrical tube to load the wiper blade and then to release it whereby the wiper blade will sweep across the surface of the planar filter member to remove the spent grounds therefrom.

BRIEF DESCRIPTION OF THE DRAWINGS

Having thus generally described the nature of the invention, reference will now be made to the accompanying drawings, showing by way of illustration, a preferred embodiment thereof, and in which:

FIG. 9 is a fragmentary horizontal radial cross-section taken along line 9—9 of FIG. 5; and FIG. 10 is a fragmentary vertical crosssection taken along line 10—10 of FIG. 2.

DESCRIPTION OF THE PREFERRED EMBODIMENTS

Figure 1:
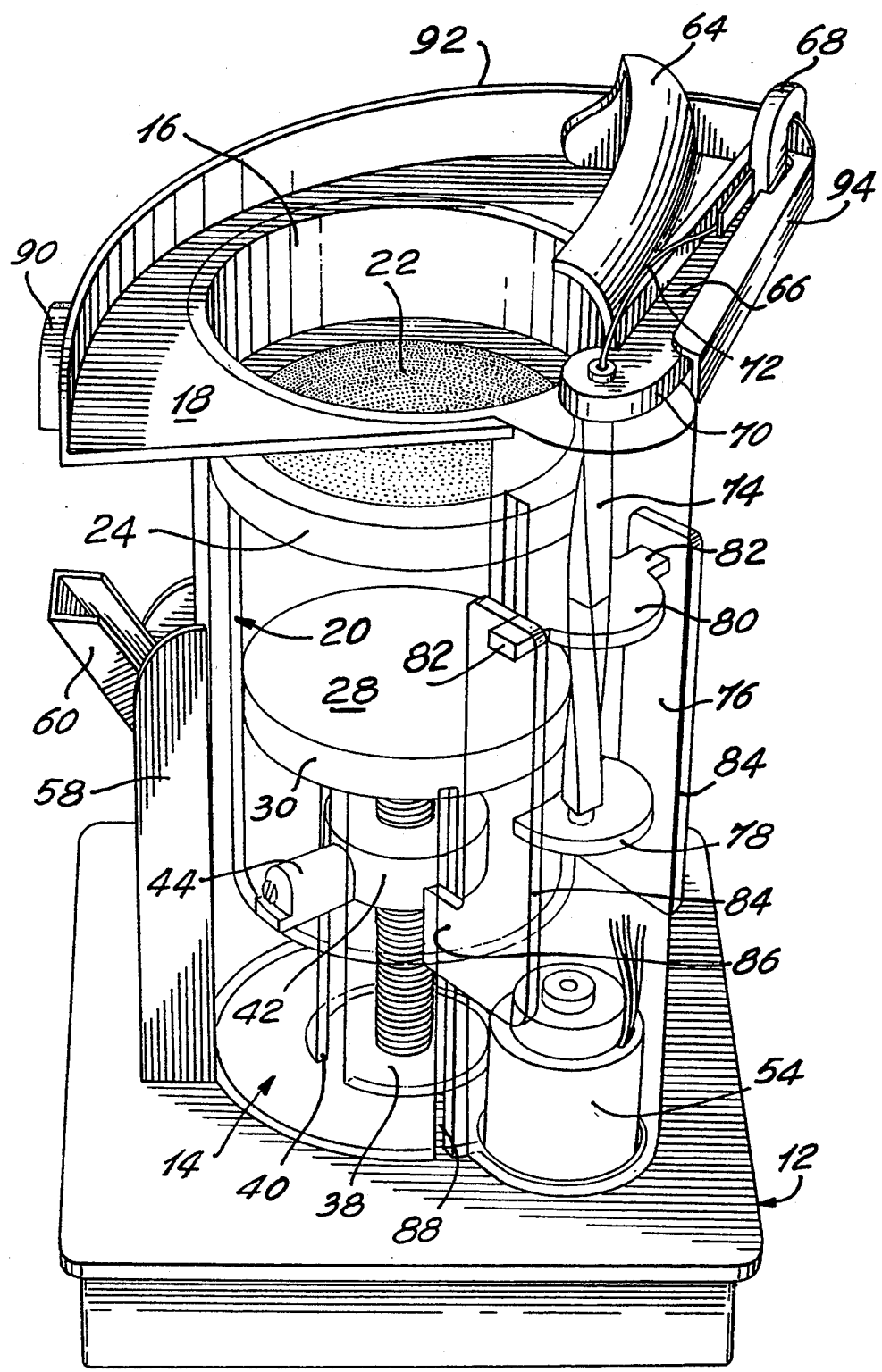
FIG. 1 is a perspective view of the coffee brewer in accordance with the present invention.

Referring now to the drawings and in particular to FIG. 1, there is shown a coffee brewer 10 having a base 12. The embodiment shown in FIG. 1 is transparent in order to best see the various operative elements. First, there is an upstanding outer cylindrical tube 14 mounted on a base 12. The tube 14 is fixed, and other elements are mounted thereto.

The top of the cylinder 14 includes an opening 16, and a platform 18 surrounds the opening 16 and extends in a radial plane relative to the tube 14.

Figure 4:
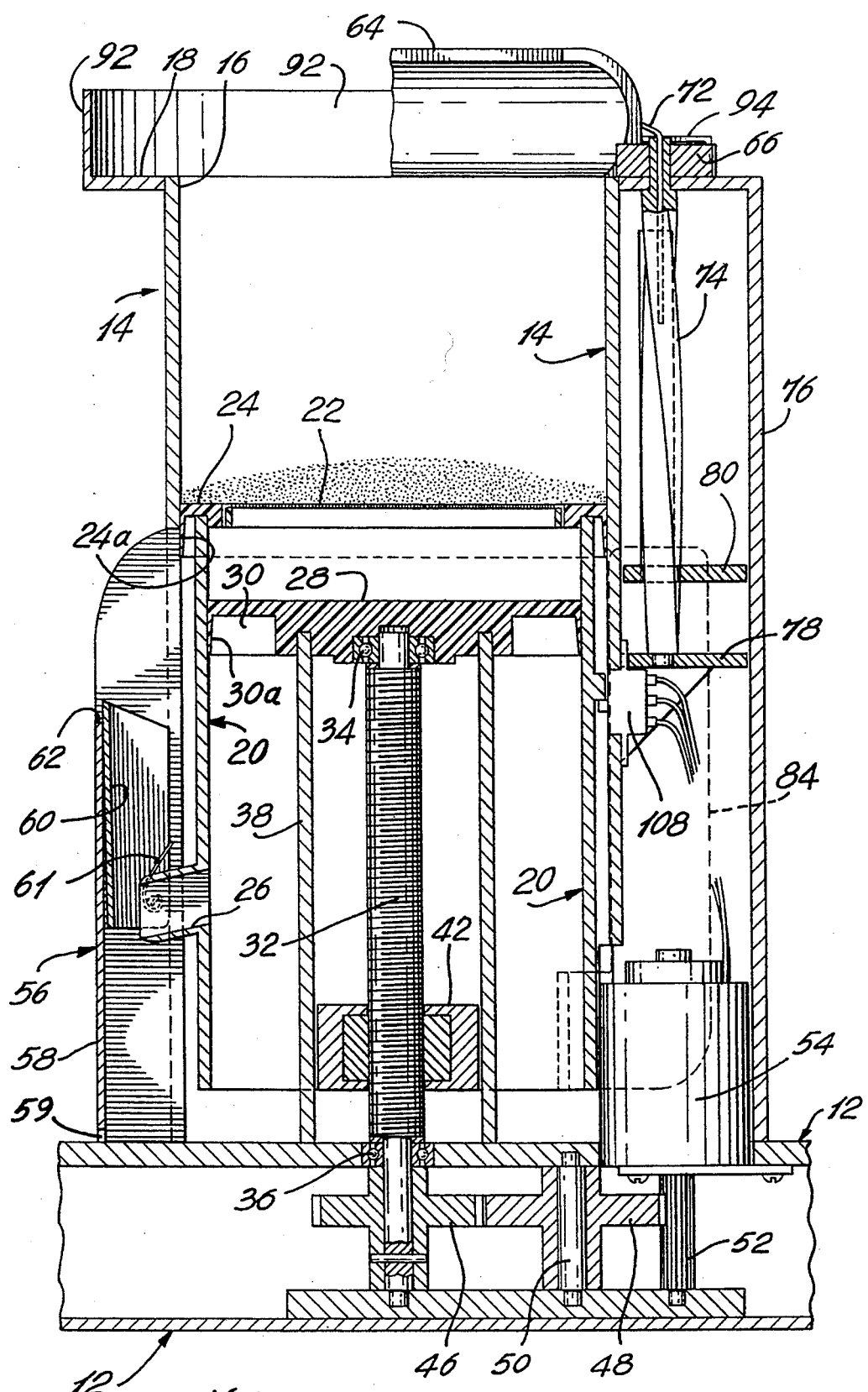
FIG. 4 is a vertical axial cross-section showing the brewer in its initial operative position.
Figure 5:
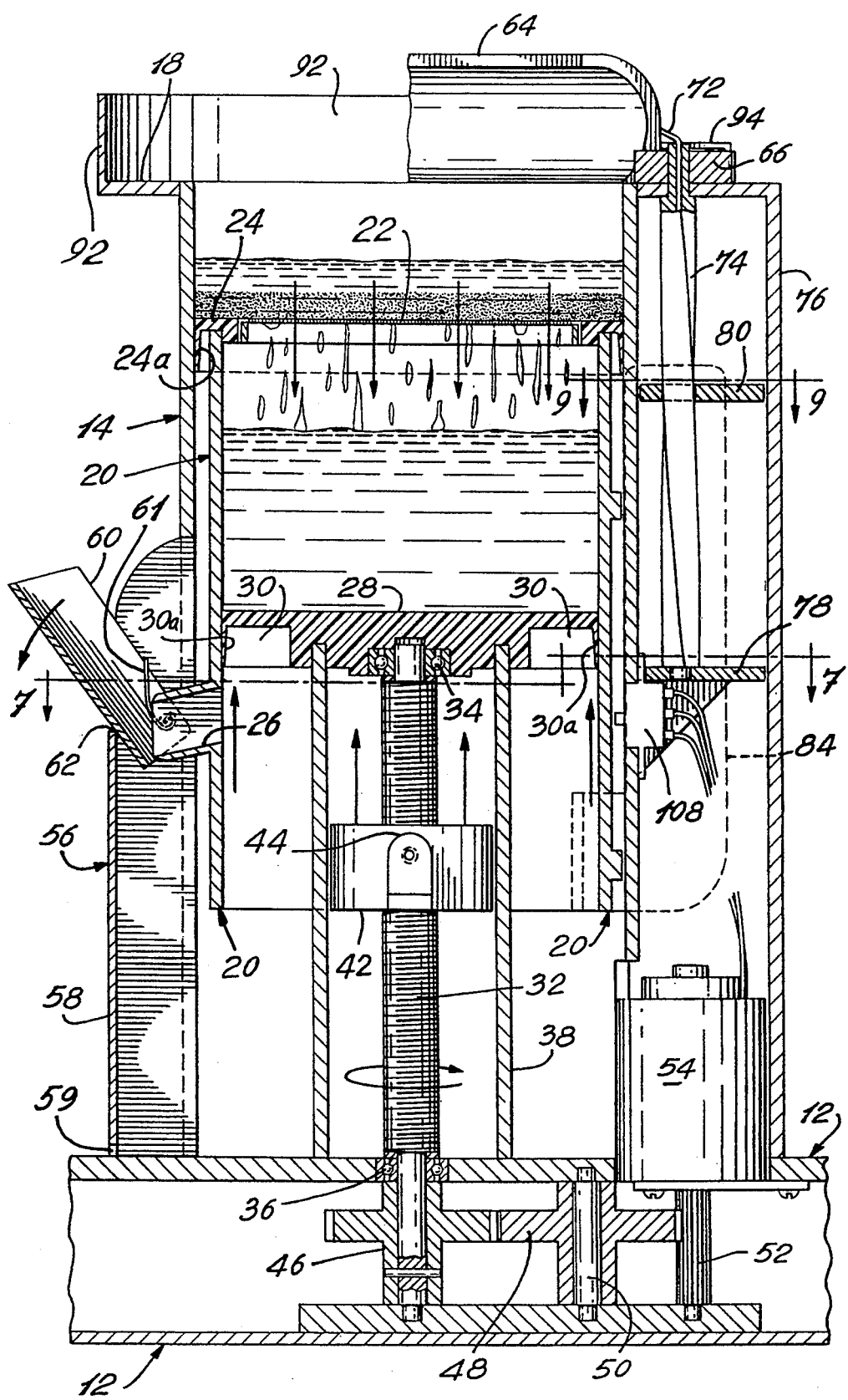
FIG. 5 is a vertical axial cross-section, similar to FIG. 4, showing the brewer in a successive operative position.
Figure 6:
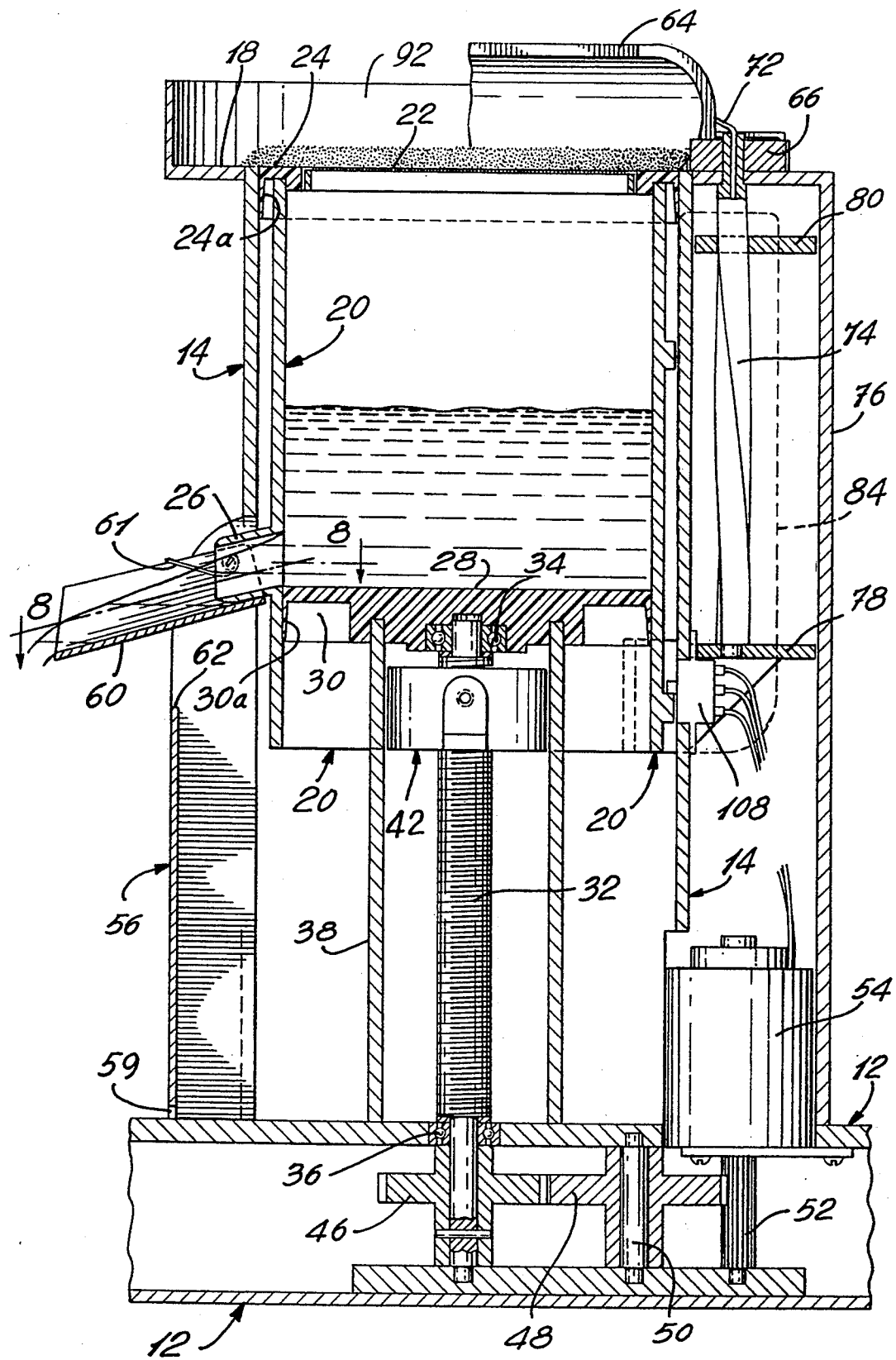
FIG. 6 is a vertical axial cross-section, similar to FIGS. 4 and 5, showing the brewer in a further successive operative position.
Figure 7:
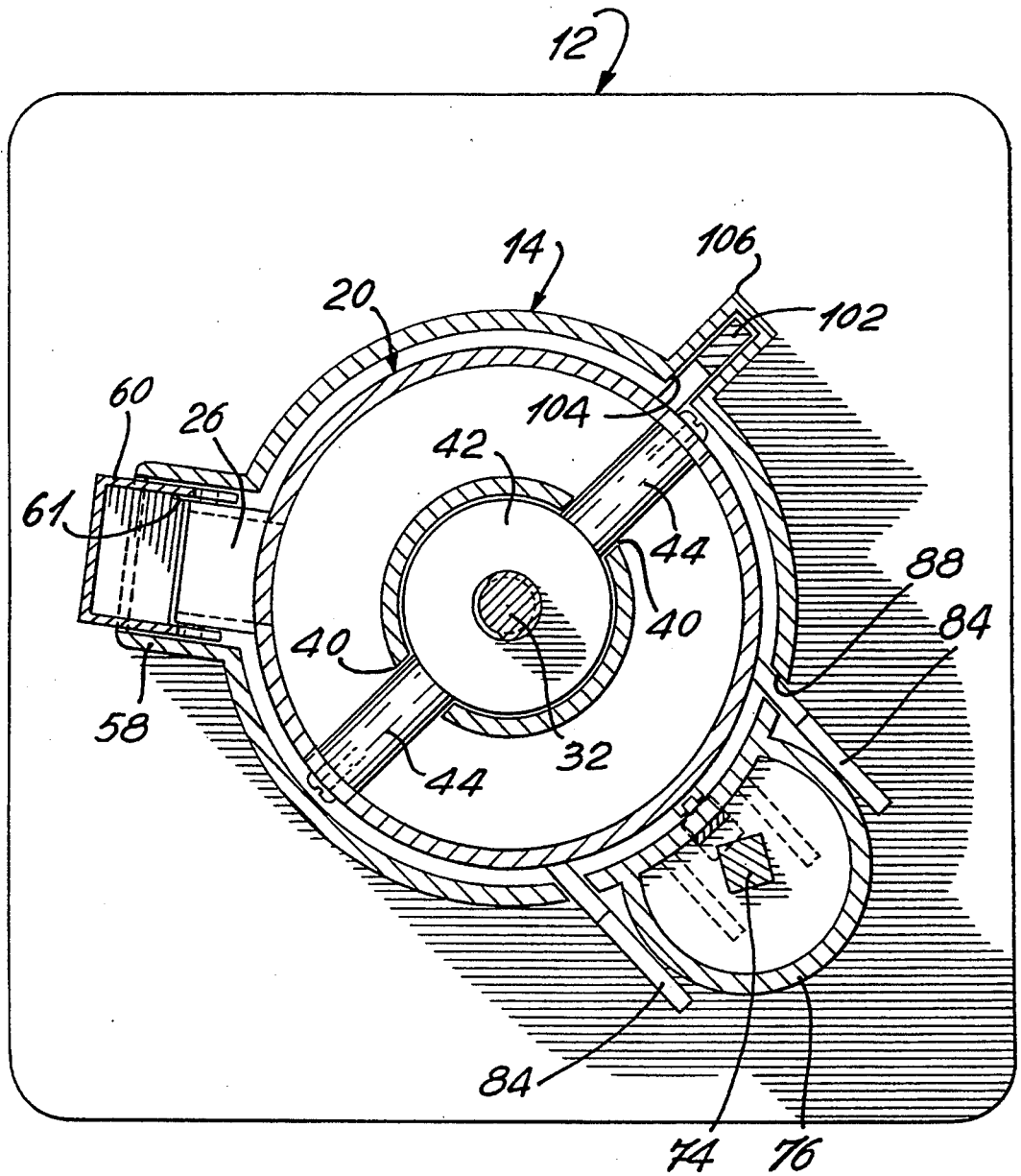
FIG. 7 is a horizontal radial cross-section taken along line 7—7 of FIG. 5.

An inner cylindrical tube 20 is adapted for sliding movement within the outer tube 14. The interrelation between inner tube 20 and outer tube 14 is best seen in FIGS. 4 to 6. Inner tube 20 is provided with a permanent filter 22 at the top thereof. In one embodiment, the filter 22 is a micro-etch stainless steel screen No. 228, material type 304, made by Buckbee-Mears, St. Paul. The top surface of the screen 22 is flush with the top of the tube 20.

An annular gasket 24 extends about the periphery of the tube 20 in the same plane as the screen 22. The gasket 24 has a particular configuration which includes a downwardly extending flange or skirt 24a which is in sealing contact with the inner surface of the outer cylindrical tube 14. The skirt 24a has a 1° outward flare so as to better contact the inner surface of the outer tube 14. The gasket may be nylon, polyethylene, or polypropylene, that is, a plastic material having a degree of lubrication. The tubes 14 and 20, in the present embodiment, are of polycarbonate or polysulfon and must resist high temperatures. The inner cylindrical tube 20 is provided with a spout 26 located in the lower half of the tube and on the wall thereof. This spout 26 will be described in more detail hereinafter.

A piston head 28 includes a gasket 30 similar to gasket 24, and the gasket 30 is provided with a flared skirt 30a. The gasket 30 is in sealing contact with the inner surface of the inner tube 20. The piston head 28 may be mounted at the top of a mounting tube 38 which is fixed to the base 12. A rotating shaft 32 extends between the piston head 28 and the base 12 and is journalled in bearings 39 and 36 respectively. The shaft 32 is threaded, and a threaded collar 42 cooperates with the threads on the shaft 32. Shaft 32 is driven by motor 54, in the present embodiment, by the intermediary of gears 46, 48, and 52. Gear 48, for instance, is fixedly mounted to an idler spindle 50 as shown in FIGS. 4, 5, and 6.

The threaded collar 42 includes arms 44 which extend through slots 40 in the tubular member 38, and the arms 44 are fixedly connected to the bottom portion of the tube 20. Thus, the tube 20 will slide axially within the tube 14 when motor 54 drives the shaft 32 and thus the threaded collar 42 with arms 44.

A spout assembly 56 includes a closed channel 58 mounted on the exterior wall of tube 14, but in radial alignment with the spout 26. The closed channel 58 surrounds a slot in the tube 14 which accommodates the spout 26. The closed channel 58 is provided with a cutout portion having a lip 62. A pivoting spout segment 60 is pivotally mounted to the spout 26 and is spring loaded and slides within the closed channel 58.

The operation of the brewer will now be described in which reference will be made to FIGS. 4 through 6. FIG. 4 illustrates the initial position of the brewer 10. Thus, the filter 22 is spaced upwardly from the piston head 28 and is thus intermediate the top of the tube 14 and piston head 28. Coffee grounds and hot water are first poured into the open end 16 of the tube 14, and the grounds will rest on the filter 22 as shown in FIG. 4. Initially, air is trapped between the filter 22 and the piston head 26.

The motor 54 will then be activated, and the tube 20 will move in a downward direction forcing air between the filter 22 and piston head 28 to pass through the mesh of the filter 22, thus percolating the grounds and hot water in the space between the filter 22 and the tube 14 thereabove. Water will begin to filter through the screen 22 after having been mixed with the coffee grounds.

When the tube 20 reaches its lowermost position, the motor will then reverse, and the shaft 32 will rotate in the opposite direction to drive collar 42 so that the tube 20 will begin its upward ascent as shown in FIG. 5. As the tube 20 travels in an upward direction, a negative pressure will be created below the filter 22 in the space above the piston head 28. This will help draw the coffee solution through the filter 22 more rapidly into the space between the filter 22 and the piston head 28 and the wall of the tube 20.

In the meantime, as the tube 20 moves upwardly, the spout 26 with the spout segment 60 also moves upwardly in the closed channel 58 until the pivoting spout segment 60 passes the lip 62. The spring will cause the spout segment 60 to assume a downwardly angled position as shown in FIG. 6. As the spout 26 in the wall of the tube 20 moves upwardly past the piston head 28, it will be in fluid communication with the coffee solution, thus allowing the coffee to pour through the spout 26 and down the spout segment 60 into a cup or other receptacle, not shown. As shown in FIG. 6, the tube 20 has now reached its uppermost position in the tube 14, and the screen 22 is flush with the platform 18.

The wiper mechanism will now be described. The wasted coffee grounds are wiped clean from the top surface of the screen 22 by the wiper blade 64 before the tube 20 returns to its initial position as shown in FIG. 4.

The wiper blade 64 is mounted on an arm 66 which is normally held loaded by means of a catch 96 as shown in FIG. 10. The loaded position of the wiper blade is shown in FIG. 1. The arm 66 includes a guide member 68 which travels on the flange 92 of the platform 18. It is the guide member 68 which is held by the catch 96 in the loaded position. A tension spring 72 is associated with the arm 66 and is connected to a spiral rod 74 which is journalled in the arm 66. In fact, the arm 66 is mounted for rotation on the rod 74 and independently of the rod. The spiral rod 74 extends along an axis which is parallel to the axis of the shaft 32. The rod is journalled at its bottom end to base 78 in the housing 76. In this embodiment, the spiral rod 74 has a square cross-section and is rotated by means of the actuating member 80 which travels in the housing 76. The actuating member 80 includes arms 82 passing through slots in the housing 76 which are connected to side members 84 which in turn pass through slots 88 in the tube 14. The side members 84 have extensions 86 fixed directly to the wall of the tube 20 so that the actuating member 80 will move in direct relationship to the movement of the inner tube 20. The movement of actuating member 84 causes the spiral member 74 to rotate. Spring member 72, which is in the form of a spring wire, is fixedly connected at one end to the top of spiral rod 74.

As shown in FIG. 10, the catch 96 which holds the wiper arm 66 in its loaded position is mounted, in this embodiment, at the end of a lever 98 pivoted at 100 underneath the platform 18. The lever 98 is actuated by an elongated actuating member 102 which travels in the channel 106 and is connected to the outer wall of the tube 20 by means of an arm 103 passing through the slot 104 in the cylindrical tube wall 14 and connected to tube 20.

Figure 2:
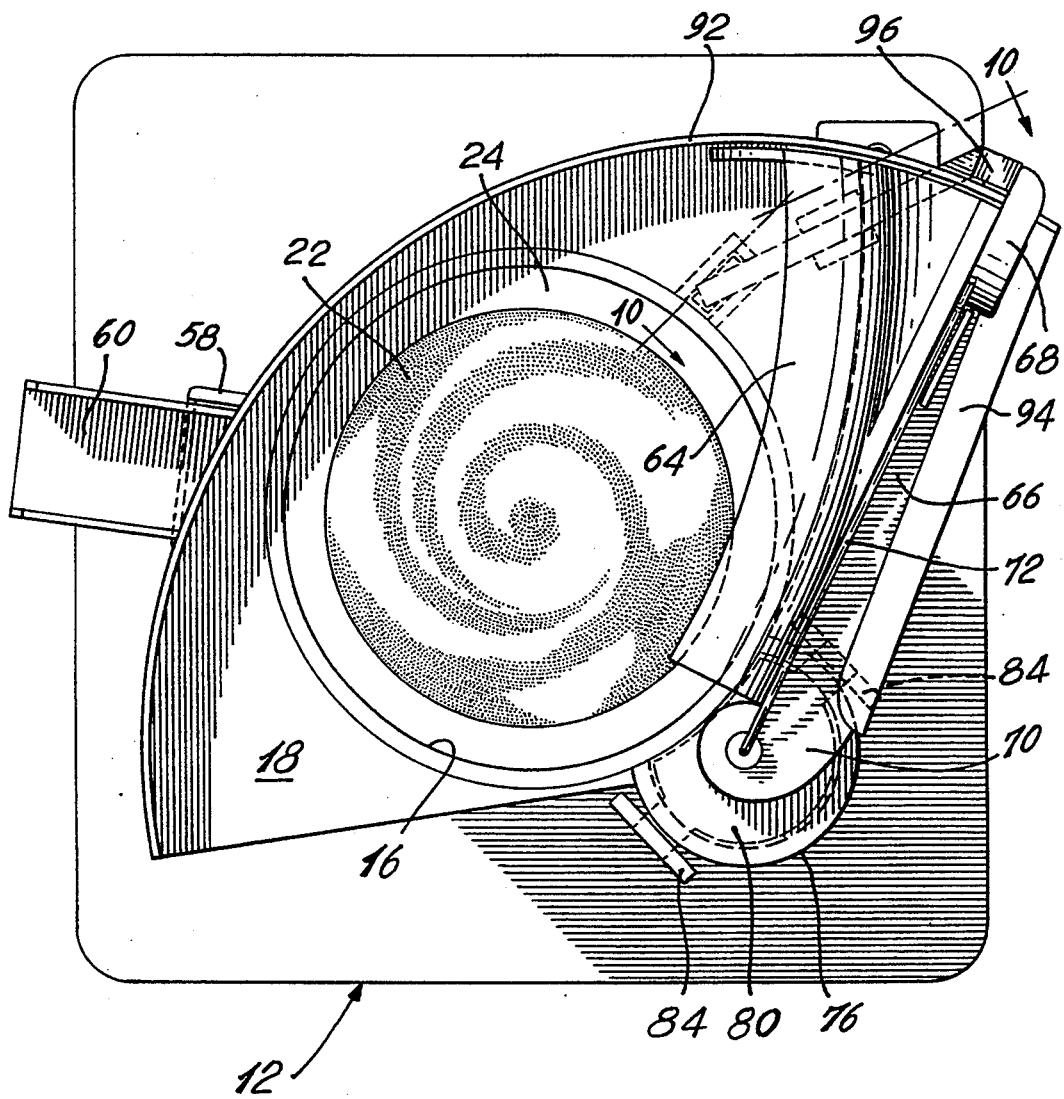
FIG. 2 is a top plan view thereof.
Figure 3:
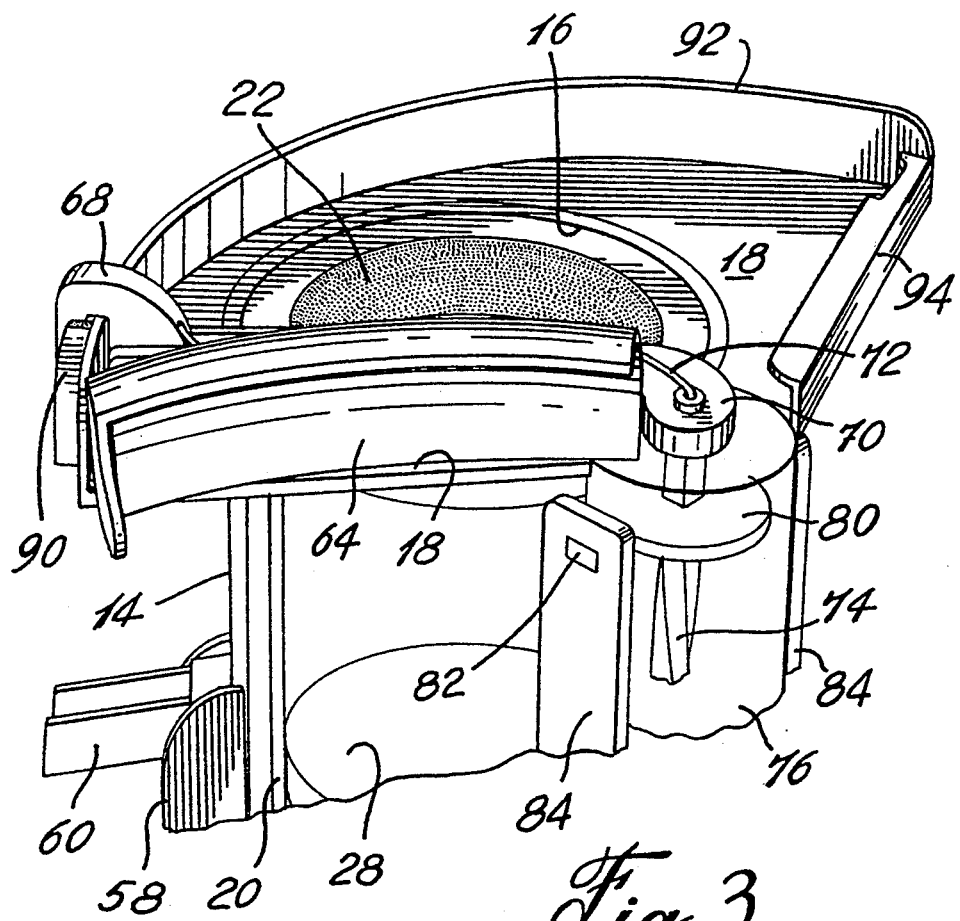
FIG. 3 is a fragmentary perspective view showing the brewer in a different operative position.
Figure 8:
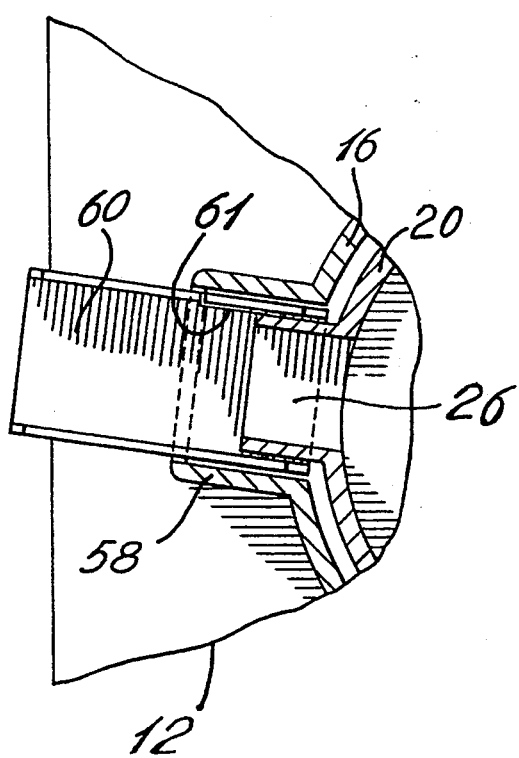
FIG. 8 is a fragmentary horizontal radial cross-section taken along line 8—8 of FIG. 6.

Thus, as can be seen from FIGS. 4 through 6 and 10, the wiper blade 64 is released when the tube 20 arrives at its uppermost-position with the filter 22 flush with the platform 18 since the actuating member 102 will cause the lever 98 to move the catch 96, thereby releasing the arm 66 and guide member 68. As seen in FIGS. 2 and 3, the wiper blade 64 moves across the platform 18 and the filter 22 which is in the same plane, thereby wiping the wasted coffee grounds from the top of the filter 22. This movement is counterclockwise. As shown in FIG. 3, a stopper 90 would be provided on the flange 92 at the end of the movement of the wiper blade 64.

When the tube 20 resumes its downward movement towards the initial position shown in FIG. 4, the actuating member 80 in housing 76 follows downwardly and rotates the spiral rod 74 which is directly connected to the spring member 72. This rotation of the rod 74 will provide a clockwise rotation movement to the spring 72, thereby returning the wiper blade 64 and the arm 66 to its initial position behind the catch 96. The wiper blade 64 will reach this position at approximately the same time as the tube 20 has reached its initial position shown in FIG. 4.

When the brewing cycle is initiated, the actuating member 80 will first move downwardly, but then when the tube 20 begins its upward movement, the rotation of the rod will be reversed because the actuating member 80 is now moving upwardly and will tend to move the spring member 72 in a clockwise direction. However, since the wiper arm 66 is now locked by means of catch 96, the rotation of the rod 74 will merely load the spring 72, providing it with enough energy to move abruptly, the arm 66 and wiper blade 64, counterclockwise when the catch 96 is released.

In the present embodiment, a microswitch 108 is shown located on the wall 14 and is adapted to be activated by suitable projections on the wall 20.

I claim:

1. A brewer comprising a first upright cylindrical tube having an upper portion with a smooth inner wall surface and an open top, a second cylindrical tube slidable within the first cylindrical tube and including a filter means at the top end portion thereof and a smooth inner wall surface, annular gasket means about the periphery of the top end of the second cylindrical tube in sealing contact with the inner wall surface of the first cylindrical tube, motor means for moving the second cylindrical tube and the filter means axially within the first tube, a piston head provided within the second cylindrical tube and stationary relative to the first tube and including annular gasket means about the periphery thereof in sealing contact with the inner wall surface of the second cylindrical tube, a pour spout defined in the wall of the second cylindrical tube spaced axially from the top end thereof a distance such that the spout is below the piston head during most of the travel of the second cylindrical tube and is above the piston head when the filter is near the top of its travel, whereby water and infusible alimentary grounds can be poured into the open end of the first cylindrical tube above the filter means when the filter means and the second cylindrical tube are in a position intermediate the top end of the first cylindrical tube and the piston head and whereby the second cylindrical tube including the filter means is initially moved in a first axial direction towards the piston head whereby air trapped between the filter means and the piston head is forced through the filter means to create turbulence in the mixture and then the second cylindrical tube is moved upwardly towards the top end of the first cylindrical tube whereby the solution will pass through the filter under negative pressure and eventually through the spout.

2. A brewer as defined in claim 1, wherein the filter means is a flat circular planar porous filter member located at the top end of the second cylindrical tube and a wiper is provided on the top end of the first cylindrical tube, the wiper including a wiper blade on the first cylindrical tube movable in a plane parallel to the planar filter member and in sweeping contact therewith when the second cylindrical tube and the planar filter member are in the uppermost position of travel, and means are associated with the second cylindrical tube to load the wiper blade and then to release it whereby the wiper blade will sweep across the surface of the planar filter member to remove the spent grounds therefrom.

3. A brewer as defined in claim 1, wherein the first cylindrical tube is mounted on a base and support means are provided on the base for mounting the piston head, and a threaded shaft extends between the base and the piston head and is journalled thereto, motor means for driving the threaded shaft independently of the piston head and the base, threaded follower means mounted on the threaded shaft and adapted to move along the axis of the threaded shaft in response to rotation of the threaded shaft, means connecting the follower to the second cylindrical tube for moving said second cylindrical tube along the axis thereof within and relative to the first cylindrical tube.

4. A brewer as defined in claim 2, wherein the first cylindrical tube is mounted on a base and support means are provided on the base for mounting the piston head, and a shaft having cam means extends between the base and the piston head and is journalled thereto, motor means for driving the shaft independently of the piston head and the base, follower means mounted on the shaft having cam means and adapted to move along the axis of the shaft in response to rotation of the cam means, means connecting the follower to the second cylindrical tube for moving this second cylindrical tube along the axis thereof within and relative to the first cylindrical tube, a spiral rod having a constant out-of-the-round cross-section, the rod extending parallel to the axis of the movement of the second cylindrical tube and being journalled in a support member mounted to the first cylindrical tube member at one end thereof and at the other end thereof to the arm forming part of the wiper at the top of the first cylindrical tube, spring means fixed to the end of the spiral rod adjacent the wiper arm and the spring means being connected to the arm, a housing surrounding the spiral rod and a follower mounted within the housing and slidable on the housing, the follower having an opening corresponding to the out-of-the-round cross-section of the rod and accommodating the rod such that sliding movement of the follower will cause the spiral rod to rotate on its axis, and connecting means extending between the follower and the second cylindrical tube such that movement of the second cylindrical tube will cause corresponding movement of the follower and therefore the spiral rod which in turn will apply torsion to the spring means.

5. A brewer as defined in claim 4, wherein the cross-section of the spiral rod is square and the corresponding cross-section of the opening in the follower is square.

6. A brewer as defined in claim 4, wherein the spring means is in the form of a spring wire extending from the wiper arm where it is anchored to the upper end of the spiral rod where it is fixed, and rotational movement of the spiral rod will cause corresponding movement of the arm in response to the torsional force applied to the spring wire or loading of the spring wire if the arm is locked.

7. A brewer as defined in claim 1, wherein catch means are associated with the wiper arm to retain the wiper arm in a position to one side of the opening of the first cylindrical tube and whereby spring forces may be loaded in the arm to allow the wiper and the arm to move across the opening of the first cylindrical tube when the catch is released and the spring has been loaded whereby the spent alimentary grounds can be swept off the filter when the filter and the second cylindrical tube are in the uppermost position.

8. A brewer as defined in claim 7, wherein the catch is activated by a mechanical linkage connected to the second cylindrical tube so that the catch is operated to release the wiper arm in direct relation with the movement of the second cylindrical tube.

9. A brewer as defined in claim 1, wherein a housing is provided exterior of the first cylindrical tube and the housing surrounds an axial slot defined in the tube, the slot coincides with the spout on the second cylindrical tube, and an additional pivoting spout segment is pivotally mounted to the spout formed in the wall of the second cylindrical tube, wherein the segment travels in the housing and is tripped downwardly when the segment reaches the top of the housing so as to allow the solution to pour from the spout once the spout has moved above the piston head.

10. A brewer as defined in claim 1, wherein the gasket on the top of the second cylindrical tube and at the periphery of the piston head includes a flexible outwardly flared skirt in contact with the inner surface of the walls of the respective tubes.

* * * * *